J. BRADY.
SLIDE-VALVE.

No. 182,637.  Patented Sept. 26, 1876.

Witnesses
John Becker.
Fred. T. Haynes.

James Brady
by his Attorneys
Brown & Allen form a# UNITED STATES PATENT OFFICE.

JAMES BRADY, OF BROOKLYN, NEW YORK.

IMPROVEMENT IN SLIDE-VALVES.

Specification forming part of Letters Patent No. 182,637, dated September 26, 1876; application filed August 4, 1876.

*To all whom it may concern:*

Be it known that I, JAMES BRADY, of the city of Brooklyn, in the county of Kings and State of New York, have invented certain new and useful Improvements in Means for Cooling Valves of Gas, Steam, and other Engines; and I do hereby declare that the following is a full, clear, and exact description of the same, reference being had to the accompanying drawing, which forms part of this specification.

This invention consists in a main valve for gas, steam, and other engines, constructed with a hollow back, and provided with hollow stems for the circulation through said back of a cooling-current of water, air, or other fluid, whereby the valve is prevented from becoming excessively heated by its exposure to the highly-heated gas or steam in the valve-chest, and is thereby restrained from warping or sticking, and its efficiency generally is improved.

The invention also consists in the combination, with the main-shaft slide-valve of an engine, having a hollow back and pipes, or hollow stems, for the circulation through said back of a cooling-current, of hollow elbows or pivots arranged to freely connect said pipes or hollow stems with the hollow back of the valve, whereby not only the circulation of the cooling-current through the valve may be kept up, but the valve is at liberty to adjust itself to its seat without straining on the pipes or hollow stems which carry it.

Figure 1:
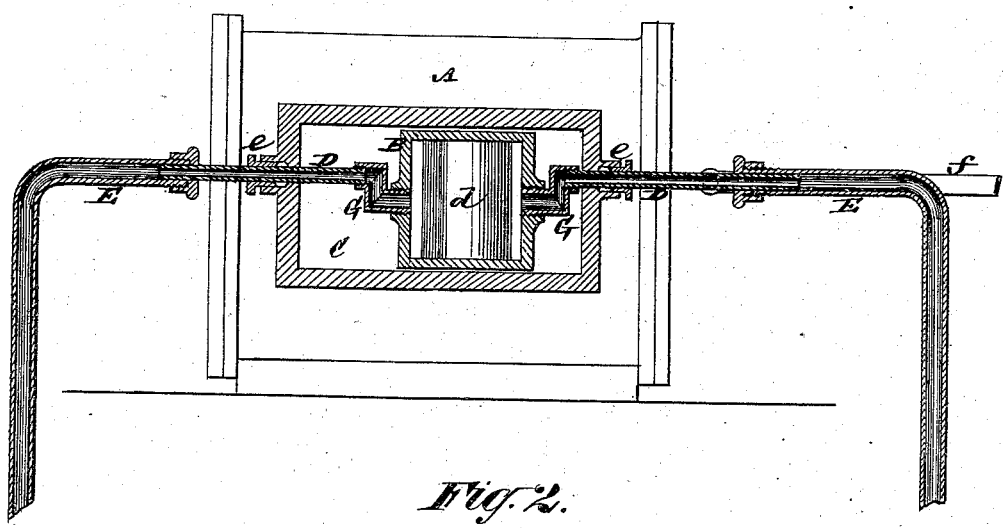
Figure 2:
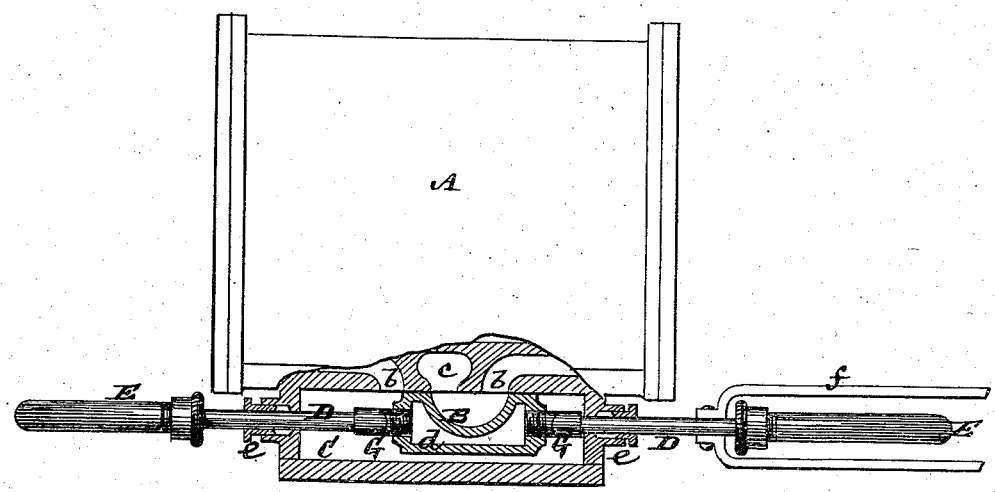

Figure 1 represents a longitudinal sectional view of the main or slide valve of an engine, with its connections, and as applied to the working cylinder, in accordance with my invention. Figure 2 is a partly sectional longitudinal view of the same at right angles to the former figure.

A is the working-cylinder of a gas, steam, or other engine, and B the valve which controls the motion of its piston. This valve may be variously constructed, and either have a straight or curvilinear motion; but it is here shown as a sliding one, of D form, arranged within a valve-chest, C, and serving to control the inlet and exhaust passages *b b c* of the engine in the usual manner of D slide-valves generally. Said valve, however, is constructed with a hollow back or body, *d*, and is fitted at its opposite ends with hollow stems or pipes D D, which travel along with the valve through stuffing-boxes *e e* in the ends of the valve-chest. Either of these hollow stems may be the driver of the valve by means of a link-rod, *f*. The outer ends of said stems work through stuffing-boxes on the ends of pipes E E, or hose may be substituted for said pipes, and the stuffing-boxes be dispensed with. One of these pipes E is an inlet-duct and the other of them an outlet-duct for keeping up a circulation of cooling water, air, or other fluid through the hollow back *d* of the valve by means of the hollow stems D D. Thus, one of the pipes E may be connected with a hydrant or with a pump, or with other means for forcing water through the hollow back of the valve, or one of the stems D might be fitted with a delivery-valve, and the pipe E, with which it connects, be fitted with an inlet-valve, whereby said stem will operate as the ram of a pump to keep up the circulation of water through the back of the valve.

An air-blast might be substituted for the forced current of water through the valve.

To provide for the valve adjusting itself to its seat without straining on the hollow stems D D, as the pressure of the steam or gas in the valve-chest acts upon the back of the valve, and as the valve-face and its seat are reduced by wear, the hollow stems D D are connected with the valve at the ends of its hollow back by bent hollow pivots or elbows G G, which are free to turn on the ends of the hollow stems D D, and within their sockets or bearings in the ends of the valve. These bearings are out of line with the hollow stems, so that, as the valve adjusts itself, the parallelism between its face and its seat is preserved.

I claim—

1. The combination, with the slide-valve, constructed with a hollow back, of two hollow valve-stems working through stuffing-boxes in the valve-chest, and communicating with the interior of said hollow back to form inlet and outlet passages thereto and therefrom, for the circulation of water or cooling fluid, substantially as and for the purpose herein described.

2. The combination of the bent hollow pivots or elbows G G with the hollow back $d$ of the slide-valve B, and the hollow stems or pipes D D, essentially as described.

JAMES BRADY.

Witnesses:
 FRED. HAYNES,
 A. J. DE LACY.